United States Patent [19]
Yamamoto et al.

[11] Patent Number: 5,468,779
[45] Date of Patent: Nov. 21, 1995

[54] METHOD FOR RECYCLING PAINTED PLASTIC MATERIALS

[75] Inventors: Naotaka Yamamoto, Ayase; Noriko Oohori, Fujisawa, both of Japan

[73] Assignee: Isuzu Motors Limited, Tokyo, Japan

[21] Appl. No.: 214,259

[22] Filed: Mar. 17, 1994

[30] Foreign Application Priority Data

Mar. 29, 1993 [JP] Japan .................................. 5-095400
Jul. 26, 1993 [JP] Japan .................................. 5-203580

[51] Int. Cl.⁶ ........................ C08J 11/00; C11D 7/32
[52] U.S. Cl. .................... 521/46.5; 521/47; 521/49.5; 252/150; 252/162; 252/171; 252/544
[58] Field of Search .................. 521/46.5, 47, 49.5; 252/150, 162, 171, 544

[56] References Cited

U.S. PATENT DOCUMENTS

| | | | |
|---|---|---|---|
| 3,819,529 | 6/1974 | Murphy | 252/156 |
| 3,972,839 | 8/1976 | Murphy | 252/548 |
| 4,770,713 | 9/1988 | Ward | 252/544 |
| 5,122,398 | 6/1992 | Seiler et al. | 428/31 |

FOREIGN PATENT DOCUMENTS

| | | |
|---|---|---|
| 0547249A1 | 6/1993 | European Pat. Off. . |
| 2213969 | 8/1974 | France . |

*Primary Examiner*—Paul R. Michl
*Assistant Examiner*—Olga Asinovsky
*Attorney, Agent, or Firm*—Kanesaka & Takeuchi

[57] ABSTRACT

A plastic material with a paint film is coarse-crushed, and a film decomposition agent, e.g. a heterocyclic compound such as imidazole, a triazine compound such as benzoguanamine, a phenylendiamine compound such as N-phenyl-N'-isopropyl-p-phenylene diamine, is added to the coarse-crushed material. The mixture is then heated and kneaded to dissolve the paint film and uniformly spread the particles of the paint film in the plastic material. The physical properties and surface quality of the plastic material are substantially the same as those of the original material.

8 Claims, 1 Drawing Sheet

METHOD FOR RECYCLING PAINTED PLASTIC MATERIALS

BACKGROUND OF THE INVENTION AND RELATED ART STATEMENT

The present invention relates to a method for recycling plastic products or plastic waste articles with painted surfaces.

In recent years, plastic products are often used for automobile parts. For example, when plastic bumpers with unpainted surfaces are recycled, defectively molded bumpers and the bumpers recovered from scrapped vehicles are coarse-crushed to a size about 3 mm cube, which are then mixed with a virgin or new material and reused to mold bumpers. This is possible because the physical properties of recycled plastic materials are not substantially degraded.

However, in the bumpers with painted surfaces, plastic materials recovered in the same manner can not be reused for bumpers. This is because, when the painted bumpers are crushed, paint films are mixed in the recycled plastic materials, so that the physical properties of the plastic materials, such as impact resistance, elongation and surface quality substantially degrade, resulting in a failure to satisfy the performance required as a bumper.

Therefore, the painted plastic bumpers which are defectively molded or those recovered from scrapped vehicles are buried in the ground or burned to thereby cause environmental disruption. Some, however, are recycled for construction piles, in which requirements regarding physical properties are not so strict.

Japanese Patent Publication (KOKAI) No. 3-23909 proposes a method for separating and recovering polyurethane and polyvinyl chloride from waste in which these compounds are laminated. In this method, the above waste composite materials are coarse-crushed to 20 to 50 mm masses, and are then pulverized by agitation in an agitator. In order to recover polyvinyl chloride, polyurethane with a particle size of 1 to 2 mm is separated by a sieve from sheet-like polyvinyl chloride with an overall size of 30 mm.

Currently, for recycling the plastic bumpers with painted surfaces, techniques are being developed to separate the plastic portions from the paint film portions and to recover only the plastic portions for recycling. The following three major techniques are generally used:

(1) Method for removing the paint film by blasting

Abrasive materials are blown with compressed air against the paint film of the painted plastic bumper to mechanically remove the film.

(2) Method for melting resin and separating the paint film with a screen

A painted plastic bumper is coarse-crushed and fed into an extruder where the plastic part is melted. Since the paint film does not melt in the extruder due to its thermosetting property, the paint is separated by a screen installed at the outlet of the extruder.

(3) Method using chemicals to release the paint film from plastic

A mixed liquid of organic salts, polyhydric alcohol and water is heated to about 100° C. A coarse-crushed painted plastic bumper is immersed in this liquid for several hours to release the paint film.

Also, Japanese Patent Publication (KOKAI) No. 2-273207 discloses a method for using vegetable type soft abrasive materials to release paint films by blasting.

Further, Japanese Utility Model Publication (KOKAI) No. 61-196021 discloses a foreign matter removing device for plastic molding material, wherein a foreign matter removal part formed of a wire gauze and a supporting body is serially located between an extruder and a mold.

With the above method (1), it is very difficult to adjust the distance between an abrasive spraying nozzle and an object, the spraying angle, air pressure, and the diameter and shape of the nozzle, because the bumper has a three-dimensional variable surface shape. If the device is not properly adjusted, the paint film is not effectively removed.

In addition, when the plastic parts are recycled, the abrasive materials remain on the plastic surface from which the paint film has been released as if cutting into the surface, so that the physical properties of the recycled material are degraded.

With the method of (2), if a screen with fine mesh is installed at the outlet of the extruder to completely remove the crushed paint film pieces, the extruding pressure must be high, so that the screen is damaged. If a screen with coarse mesh is used, the fine film pieces can not be removed.

The method of (3) can release the finished paint films but can not remove primer without degrading the physical properties of the plastic part. It is also difficult to use the method in industrial applications due to waste disposal problems.

In the method of pulverizing the materials by the agitator rotating at high speed as described in the above Japanese Publication No. 3-23909, it is possible to separate the laminated materials, but the paint films can not be removed from the plastic materials.

Accordingly, it is an object of the invention to provide a method for recycling painted plastic materials, which can omit an expensive step of releasing and separating a paint film by dissolving and uniformly spreading the paint film in the plastic material without adversely affecting the physical properties or surface quality of the plastic materials.

SUMMARY OF THE INVENTION

In the method of the invention, painted plastic materials are coarse-crushed, and after a film decomposition agent is added to the coarse-crushed materials alone or a mixture of the coarse-crushed materials and virgin or new plastic materials, the resultant materials are heated and kneaded. As a result, the painted film is dissolved and uniformly distributed or spread in the plastic materials.

When the paint film decomposition agent reacts with the paint film, the film is dissolved, decomposed to the particle level, and uniformly spread in the plastic material. Consequently, this method does not adversely affect the physical properties or surface quality of the plastic materials.

DETAILED DESCRIPTION OF PREFERRED EMBODIMENTS

Figure 1:
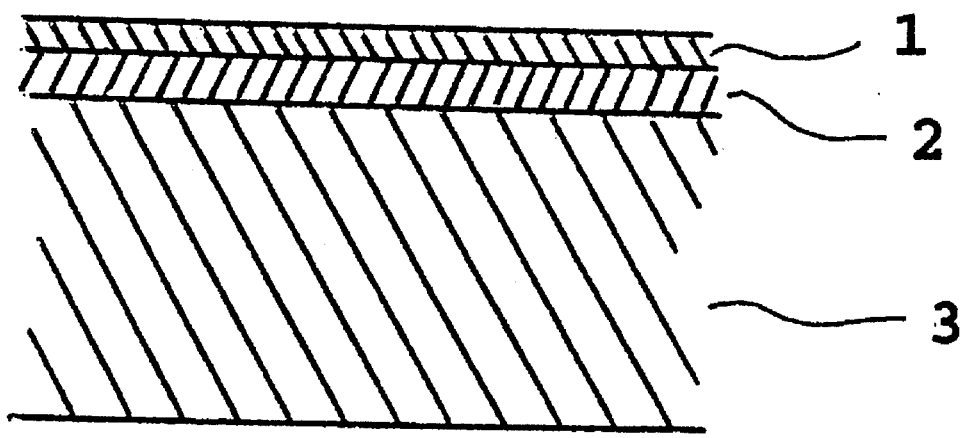
FIG. 1 is a partial sectional view of a painted plastic bumper.

The method according to the present invention is outlined with reference to a painted plastic bumper shown in FIG. 1.

In FIG. 1, a plastic material 1 is a thermoplastic resin, such as polyolefine resin or ABS resin, and a primer paint 2 and a finish paint 3 are a polyolefine chloride resin and a polyester melamine resin, respectively, which are ordinary baking enamels.

The painted plastic bumper as a waste is coarse-crushed by a crusher, and a pain film decomposition agent is added to the coarse-crushed material, which are heated to at least the temperature at which the paint film decomposition agent reacts with the paint film and then kneaded by a mixer. 2-di-n-butyl-amino-4,6-dimercapto-S-triazine is used as the paint film decomposition agent, and an extruder, a kneader or a Bambury mixer is used as the mixer.

2-di-n-butyl-amino-4,6-dimercapto-S-triazine, which is used as the paint film decomposition agent, is known as a cross-linking agent or a stabilizer for halogen-containing polymer or diene rubber. In the method according to the invention, however, the solvent does not adversely affect the physical properties and surface quality of the plastic material, because the paint and the solvent, i.e. decomposition agent, reacts with and dissolves the paint film, which is then decomposed to the particle level and uniformly spread in the plastic material.

Therefore, an effect equivalent to the removal of the paint film can be provided without separating or removing the paint film from the plastic material, and physical properties equivalent to those of the new material can be obtained. Consequently, the recycling of the painted plastic material is made practically.

Examples of the invention are shown below.

EXAMPLE I (1) Material of painted plastic bumper as samples

Plastic: polypropylene resin

Paint: primer - polyolefin chloride resin thickness: about 25 micro meter finish paint - polyester melamine resin thickness: about 30 micro meter (2) Treatment of samples The painted plastic bumper is coarse-crushed by the crusher to about 1 to 10 mm cube. 25% by weight of coarse-crushed material is added to a new material or a virgin polypropylene resin.

(3) Paint film decomposition agent 2-di-n-butyl-amino-4,6-dimercapto-S-triazine (product name: Jisunetto DB by Sankyo Kasei Inc.)

Amount added: 0.5 to 4% by weight of 2-di-n-butyl-amino -4,6-dimercapto-S-triazine is added to the aforementioned sample.

(4) Heating and mixing treatment

The mixing sample is fed into a kneader heated to 180° C. and is mixed for about one minute. The paint film decomposition agent is then added. The material is kneaded at 180° C. and about 70 rpm (rotor rotations) for about ten minutes.

Embodiment 1

The material was injection-molded to provide test samples. A tension test was used to measure rupture elongation (breaking elongation), and the surface quality was visually evaluated. Table 1 shows the results.

Table 1 indicates that the samples with 25% by weight of coarse-crushed material added to the virgin or new material can recover physical properties equivalent to those of an initial or new material when at least 2% by weight of the paint film decomposition agent is added. Therefore, the methods used for samples 5 to 7 are embodiments of this invention.

TABLE 1

| Sample No. | Amount of film decomposition agent added % | Rupture elongation % | Surface quality [visually evaluated for the presence of paint film pieces] |
|---|---|---|---|
| 1 | — | 550 | — |
| 2 | — | 140 | Film pieces were seen. |
| 3 | 0.5 | 92 | A few film pieces |
| 4 | 1.0 | 202 | No film pieces (good) |
| 5* | 2.0 | 543 | No film pieces (good) |
| 6* | 3.0 | 534 | No film pieces (good) |
| 7* | 4.0 | 542 | No film pieces (good) |

Note:
Sample 1: Sample made by molding only a virgin or new material of plastic (no paint film)
Sample 2: Sample made by remolding a material of 25% of coarse-crushed painted plastic bumper added to a virgin or new plastic material
*Embodiments

EXAMPLE II

Tables 2 to 11 show test examples in which various paint film decomposition agents were used.

The test materials, treatment of samples, and evaluation method are shown below, and the film decomposition agents and amounts added are noted in the descriptions in the tables.

(1) Materials of painted plastic bumper as samples

Plastic: polypropylene resin

Paint: primer - polyolefin chloride resin thickness: about 25 micro meter finish paint - polyester melamine resin thickness: about 30 micro meter (2) Treatment of samples The painted plastic bumper is coarse-crushed by a crusher to cubes of about 1 to 10 mm. 25% by weight of coarse-crushed material is added to a virgin or new material (polypropylene resin material), and the prescribed amount of a paint film decomposition agent is also added.

(3) Heat and mix treatment

The mixed sample is fed into a kneader and kneaded at 200° C. and about 70 rpm (rotor rotations) for 15 minutes.

(4) Preparation, testing and evaluation of samples

The material was injection-molded to provide test samples. A tension test was used to measure rupture elongation (breaking elongation), and the surface quality was visually evaluated. Table 2 and subsequent tables show the results. For reference, each table includes the rupture elongation and surface quality of the sample made by molding only a new material of plastic (no paint film) and the sample made by remolding a material of 25 wt % of coarse-crushed painted plastic bumper and a new material.

Embodiment 2

As a paint film decomposition agent, 0.1 to 0.3% by weight of 2-mercaptoimidazoline, a heterocyclic compound, is added. The compound is known and used as a vulcanization accelerator for chloroprene-hyperon rubber.

Table 2 shows the results of the evaluation. Samples 4 and 5, to which 0.2% or more of the paint film decomposition agent was added, recovered their original physical properties, and sample 3, to which 0.1% of the paint film decomposition agent was added, recovered most of its original physical properties. Therefore, the methods used for samples 3 to 5 are embodiments of the invention.

TABLE 2

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 0.1 | 498 | A few film pieces |
| 4* | 0.2 | 540 | No film pieces (good) |
| 5* | 0.3 | 540 | No film pieces (good) |

*Embodiments

Embodiment 3

As a paint film decomposition agent, 1 to 3% by weight of N-phenyl-N'-isopropyl-p-phenylene diamine, a phenylene diamine compound, is added. This compound is known and used as an antioxidant or anti-aging agent to prevent rubber with a double bond from ozone degradation, flex-cracking and sun-cracking.

Table 3 shows the results of the evaluation. Samples 4 and 5, to which 2% or more of the paint film decomposition agent was added, recovered their original physical properties (sample 1), and sample 3, to which 1% of the paint film decomposition agent was added, recovered most of its original physical properties. Therefore, the methods used for samples 3 to 5 are embodiments of the invention.

TABLE 3

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 1.0 | 465 | A few film pieces |
| 4* | 2.0 | 526 | No film pieces (good) |
| 5* | 3.0 | 595 | No film pieces (good) |

*Embodiments

Embodiment 4

As a paint film decomposition agent, 0.1 to 0.3% by weight of benzotriazole, a heterocyclic compound, is added. This compound is known and used as a corrosion inhibitor for copper and its alloys, silver and aluminum.

Table 4 shows the results of the evaluation. Samples 4 and 5, to which 0.2% or more of the paint film decomposition agent was added, recovered their original physical properties (Sample 1), and sample 3, to which 0.1% of the paint film decomposition agent was added, recovered most of its original physical properties. Therefore, the methods used for Samples 3 to 5 are embodiments of the invention.

TABLE 4

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 0.1 | 430 | A few film pieces. |
| 4* | 0.2 | 520 | No film pieces (good) |
| 5* | 0.3 | 540 | No film pieces (good) |

*Embodiments

Embodiment 5

As a paint film decomposition agent, 0.1 to 0.3% by weight of 3-amino-1,2,4-triazole, a heterocyclic compound, is added. This compound is known and used for a disperse dye, photographic chemical, curing agent for resin and herbicide.

Table 5 shows the results of the evaluation. Samples 3, 4 and 5, to which 0.1% or more of the paint film decomposition agent was added, recovered their original physical properties (Sample 1). Therefore, the methods used for samples 3 to 5 are embodiments of the invention.

TABLE 5

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 0.1 | 532 | No film pieces (good) |
| 4* | 0.2 | 666 | No film pieces (good) |
| 5* | 0.3 | 653 | No film pieces (good) |

*Embodiments

Embodiment 6

As a paint film decomposition agent, 0.1 to 1.0% by weight of 2-methylimidazole, a heterocyclic compound, is added. The compound is known and used as a resin hardening agent, an industrial disinfectant and a rust preventing agent.

Table 6 shows the results of the evaluation. Sample 5, to which 1% of the paint film decomposition agent was added, recovered its original physical properties (Sample 1). Sample 4, to which 0.5% of the film decomposition agent was added, recovered most of its original physical properties. Therefore, the methods used for samples 4 and 5 are embodiments of the invention.

TABLE 6

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 0.1 | 245 | A few film pieces. |
| 4* | 0.5 | 432 | No film pieces (good) |
| 5* | 1.0 | 541 | No film pieces (good) |

*Embodiments

Embodiment 7

As a paint film decomposition agent, 5% by weight of N-cyclohexyl-2-benzothiazole sulfaneamido, a heterocyclic compound, is added. This compound is known and used as a vulcanization accelerator for rubber.

Table 7 shows the results of the evaluation. Sample 3, to which 5% of the paint film decomposition agent was added, recovered most of its original physical properties. Therefore, the method used for sample 3 is an embodiment of this invention.

TABLE 7

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 5.0 | 462 | A few film pieces. |

*Embodiments

Embodiment 8

As a paint film decomposition agent, 5% by weight of 2-phenylimidazole, a heterocyclic compound, is added.

Table 8 shows the results of the evaluation. Sample 3, to which 5% of the paint film decomposition agent was added, recovered most of its original physical properties. Therefore, the method used for sample 3 is an embodiment of the invention.

TABLE 8

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 5.0 | 547 | A few film pieces |

*Embodiments

Embodiment 9

As a paint film decomposition agent, 5% by weight of 2,4,6-triaryloxine-1,3,5-triazine (cyanuric acid triaryl), a heterocyclic compound, is added.

Table 9 shows the results of the evaluation. Sample 3, to which 5% of the film decomposition agent was added, recovered most of its original physical properties. Therefore, the method used for sample 3 is an embodiment of this invention.

TABLE 9

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 5.0 | 354 | A few film pieces |

*Embodiments

Embodiment 10

As a paint film decomposition agent, 5% by weight of benzoguanamine (2,4-diamine-6-phenyl-1,3,5-triazine), a triazine compound, is added. This compound is known and used as a vehicle for baking enamel, a cosmetic board, and fiber and paper processing resin. The heating and mixing of this sample were exceptionally performed at 250° C.

Table 10 shows the results of the evaluation. Sample 3, to which 5% of the paint film decomposition agent was added, recovered its original physical properties and provided good surface quality. Therefore, the method used for sample 3 is an embodiment of this invention.

TABLE 10

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 5.0 | 280 | No film pieces (good) |

*Embodiments

Embodiment 11

As a paint film decomposition agent, 5% by weight of imidazole, a heterocyclic compound, is added. The compound is known and used as a resin hardening agent and a rust preventing agent.

Table 11 shows the results of the evaluation. Sample 3, to which 5% of the film decomposition agent was added, recovered its original physical properties and provided a good surface quality. Therefore, the method used for sample 3 is an embodiment of this invention.

TABLE 11

| Sample No. | Amount of film decomposition agent added % | Rupture elongation % | Surface quality [visually evaluated for the presence of film pieces] |
| --- | --- | --- | --- |
| 1 | — | 550 | — |
| 2 | — | 140 | Film pieces were seen. |
| 3* | 5.0 | 530 | No film pieces (good) |

*Embodiments

Example III is described below.

(1) Material of painted plastic bumper as samples

Plastic: polypropylene resin

Paint: primer - polyolefin chloride resin thickness: about 25 micro meter finish paint - polyester melamine resin thickness: about 30 micro meter (2) Treatment of samples The painted plastic bumper in (1) is coarse-crushed by the crusher to cubes of about 1 to 10 mm. A prescribed amount of film decomposition agent is added to 100% coarse-crushed material which is a recycled material. The mixed material is fed into the kneader and kneaded at 200° C. and 70 rpm (rotor rotations) for 15 minutes.

(3) Film decomposition agent 0.3 to 1.5% by weight of benzotriazole is added to the coarse-crushed material, which is a 100% recycled material.

(4) Preparation, testing and evaluation of samples

The test pieces were prepared from the above mixture by using an injection molding machine. A tension test was performed to measure rupture elongation (breaking elongation), and the surface quality was visually valuated.

Embodiment 12

As a paint film decomposition agent, 0.3 to 1.5% by weight of benzotriazole is added. The compound is known and used as a corrosion inhibitor for copper and its alloys, silver, and aluminum.

Table 12 shows the results of the evaluation. Samples 4 to 6, to which 0.5 to 1.5% by weight of the paint film decomposition agent was added, recovered the original physical properties of a virgin or new material (containing no paint) and provided a good surface quality. Therefore, the methods used for samples 4 to 6 are embodiments of this invention.

Sample 1 was made by molding only a virgin or new material of plastic (no paint film), and sample 2 was made by molding a coarse-crushed material which is a 100% recycled material. These samples are included in the table for comparison.

TABLE 12

| Sample No. | Amount of film decomposition agent added % | Rupture elongation % | Surface quality [visually evaluated for the presence of film pieces] |
| --- | --- | --- | --- |
| 1 | — | 660 | — |
| 2 | — | 140 | Film pieces were seen. |
| 3 | 0.3 | 132 | A few film pieces |
| 4 | 0.5 | 510 | No film pieces (good) |
| 5* | 1.0 | 586 | No film pieces (good) |
| 6* | 1.5 | 600 | No film pieces (good) |

*Embodiments

Embodiment 13

The same painted plastic bumper as in the previous test example was used as a sample and treated in the same manner as in the previous test example. 0.1 to 0.6% by weight of 3-amino-1,2,4-triazole was added to a coarse-crushed material which is a 100% recycled material. The preparation, testing, and evaluation of test pieces were executed in the same manner as in the previous test example.

3-amino-1,2,4-triazole is known and usually used as a disperse dye, photographic chemical, resin hardening agent, and herbicide.

Table 13 shows the results of the evaluation. Samples 5 and 6, to which 0.4 to 0.6% by weight of the paint film decomposition agent was added, recovered the original physical properties of an initial material shown in sample 1 (containing no paint) and provided a good surface quality. Therefore, the methods used for Samples 5 and 6 are embodiments of this invention.

TABLE 13

| Sample No. | Amount of film decomposition agent added % | Rupture elongation % | Surface quality [visually evaluated for the presence of film pieces] |
| --- | --- | --- | --- |
| 1 | — | 660 | — |
| 2 | — | 140 | Film pieces were seen. |
| 3 | 0.1 | 167 | A few film pieces |
| 4 | 0.2 | 133 | A few film pieces |
| 5* | 0.4 | 627 | No film pieces (good) |
| 6* | 0.6 | 630 | No film pieces (good) |

*Embodiments

These tests suggest that a heterocyclic compound, such as 2-mercaptoimidazoline, benzotriazole, 3-amino-1,2,4-triazole, 2-methylimidazole, N-cyclohexyl-2-benzothiazole-sulfaneamido, 2-phenylimidazole or imidazole is effective as a film decomposition agent. It is supposed that these compounds would still be effective if two or more compounds were mixed.

The film decomposition agent may be a triazine compound, such as melamine, isomelamine, acetoguanamine, guanimelamine, 2,4,6-trimercapto-S-triazine, a triazine compound, isocyanuric acid or isocyanuric acid ester (triaryl cyanurate or triisocyanurate) in addition to 2-di-n-butyl-amino-4,6-dimercapto-S-triazine, 2,4,6-triaryloxine-1,3,5-triazine or benzoguanamine, which were used in the above tests.

In addition to N-phenyl-N'-isopropyl-P-phenylene diamine used in the above tests, a phenylendiamine compound, such as N,N'-diphenyl-P-phenylendiamine, N-phenyl-N'-1,3-dimethylbutyl-P-phenylendiamine, N,N'-di-Beta-naphthyl-P-phenylendiamine or N,N'-diaryl-P-phenylendiamine can also be used.

The conventional recycling of the painted plastic materials depends on the separation and removal of paint film from the plastic materials. However, in the invention, the paint film is completely dissolved and uniformly spread in the plastic material to avoid adverse effects on the physical properties and surface quality of the plastic material by adding a paint film decomposition agent to a coarse-crushed plastic material. Consequently, the most expensive steps of releasing and separating the paint film can be omitted to substantially reduce recycling costs.

Although the above embodiments have been described in conjunction with a painted plastic bumper, this invention is also applicable to the recycling of other automobile parts, such as wheel covers or side mirror covers. This invention also allows the recycling of plastic parts other than the automobile parts when their surfaces are painted or treated by other techniques.

In the present invention, the paint film is completely dissolved and uniformly spread in the plastic material in order to avoid adverse affects on the physical properties and surface quality of the plastic material to be recycled. It also eliminates the most expensive step of releasing and separating film to thereby substantially reduce recycling costs.

While the invention has been explained with reference to the specific embodiment of the invention, the explanation is illustrative and the invention is limited only by the appended claims.

What is claimed is:

1. A method of recycling painted plastic material comprising, coarse-crushing a thermoplastic plastic material with a baking paint film for the thermoplastic plastic material, supplying a paint film decomposition agent to said coarse-crushed plastic material with the paint film in an amount of 0.1 to 5.0% by weight relative to the coarse-crushed plastic material with the paint film, said film decomposition agent being a heterocyclic compound selected from the group consisting of 2-mercaptoimidazoline, benzotriazole, 3-amino-1,2,4-triazole, 2-methylimidazole, N-cyclohexyl-2-benzothiazole-sulfaneamido, 2-phenylimidazole and imidazole, and heating and kneading the coarse-crushed plastic material with the paint film decomposition agent so that the paint film is dissolved and particles of the dissolved paint film are uniformly spread in the plastic material.

2. A method of recycling painted plastic material comprising, coarse-crushing a thermoplastic plastic material with a baking paint film for the thermoplastic plastic material, supplying a paint film decomposition agent to said coarse-crushed plastic material with the paint film in an amount of 2.0 to 5.0% by weight relative to the coarse-crushed plastic material with the paint film, said film decomposition agent being a triazine compound selected from a group consisting of 2-di-n-butylamino-4,6-dimercapto-S-triazine, 2,4,6-triaryloxine-1,3,5-triazine, benzoguanamine, melamine, isomelamine, acetoguanamine, guanimelamine, 2,4,6-trimercapto-S- triazine, a triazine compound, isocyanuric acid and isocyanuric acid ester, and heating and kneading the coarse-crushed plastic material with the paint film decomposition agent so that the paint film is dissolved and particles of the dissolved paint film are uniformly spread in the plastic material.

3. A method of recycling painted plastic material comprising, coarse-crushing a thermoplastic plastic material with a baking paint film for the thermoplastic plastic material, supplying a paint film decomposition agent to said coarse-crushed plastic material with the paint film in an amount of 1.0 to 3.0% by weight relative to the coarse-crushed plastic material with the paint film, said film decomposition agent being a phenylendiamine compound selected from a group consisting of N-phenyl-N'-isopropyl-P-phenylenediamine, N,N'-diphenyl-P-phenylendiamine, N-phenyl-N'-1,3-dimethylbutyl-p-phenylendiamine, N,N'-di-beta-naphthyl-P-phenylendiamine and N,N'-diaryl-P-phenylendiamine, and heating and kneading the coarse,crushed plastic material with the paint film decomposition agent so that the paint film is dissolved and particles of the dissolved paint film are uniformly spread in the plastic material.

4. A method according to claim 1, further comprising molding the heated and kneaded plastic material containing the particles of the paint film for reuse.

5. A method according to claim 4, further comprising adding new thermoplastic plastic materials to said coarse-crushed plastic materials with the paint film to provide a mixture thereof.

6. A method according to claim 1, wherein said baking paint film for the thermoplastic plastic material is selected from the group consisting of a polyolefine chloride resin and a polyester melamine resin, and said thermoplastic plastic material is selected from the group consisting of polyolefine resin and ABS resin.

7. A method according to claim 2, further comprising adding new thermoplastic plastic materials to said coarse-crushed plastic materials with the paint film to provide a mixture thereof, and molding the heated and kneaded plastic material containing the particles of the paint film for reuse.

8. A method according to claim 3, further comprising adding new thermoplastic plastic materials to said coarse-crushed plastic materials with the paint film to provide a mixture thereof, and molding the heated and kneaded plastic material containing the particles of the paint film for reuse.

\* \* \* \* \*